United States Patent
Tsubakimoto et al.

[11] Patent Number: 5,834,603
[45] Date of Patent: Nov. 10, 1998

[54] POLYMERIZATION INITIATOR COMPOSITION

[75] Inventors: Tsuneo Tsubakimoto; Toshiyasu Sato; Hisayuki Suzuki, all of Chiba, Japan

[73] Assignee: Nippoh Chemicals Co., Ltd., Tokyo, Japan

[21] Appl. No.: 974,139

[22] Filed: Nov. 19, 1997

[30] Foreign Application Priority Data

Nov. 26, 1996  [JP]  Japan .................................. 8-315256

[51] Int. Cl.$^6$ ...................................................... C08F 4/04
[52] U.S. Cl. .......................... 534/738; 534/751; 534/838; 534/887; 502/167
[58] Field of Search ...................... 534/738, 751, 534/838, 887; 502/167

[56] References Cited

U.S. PATENT DOCUMENTS

| | | | |
|---|---|---|---|
| 3,428,618 | 2/1969 | Cook et al. | 526/204 |
| 4,500,649 | 2/1985 | Tanaka et al. | 502/167 |
| 4,504,640 | 3/1985 | Harada et al. | 526/193 |
| 4,774,303 | 9/1988 | Denzinger et al. | 526/212 |
| 4,916,216 | 4/1990 | Tanaka et al. | 534/738 |
| 5,650,498 | 7/1997 | Amo et al. | 534/738 X |

FOREIGN PATENT DOCUMENTS 9-059242  3/1997  Japan .

OTHER PUBLICATIONS

Watanabe et al., Chemical Abstracts, 126:277205 (1997).

*Primary Examiner*—Fiona T. Powers
*Attorney, Agent, or Firm*—Mathews, Collins, Shepherd & Gould, P.A.

[57] ABSTRACT

A polymerization initiator composition, comprising an azo-bisamidine salt represented by the general formula (1)

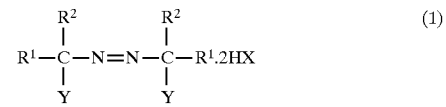

wherein $R^1$ and $R^2$ independently represent an alkyl group or a cycloalkyl group, providing that $R^1$ and $R^2$ may together form an aliphatic ring, and Y represents $-C(=NR^3)-NH-R^4$ or a guanyl group represented by the formula (2)

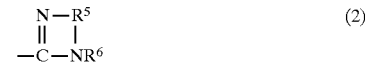

wherein $R^3$ and $R^4$ independently represent a hydrogen atom, an alkyl group, a substituted alkyl group, a cycloalkyl group, an allyl group, a phenyl group, or a substituted phenyl group, $R^5$ represents a lower alkylene group optionally containing a substituent group, and $R^6$ represents a hydrogen atom or a hydroxyalkyl group, and X represents a chlorine atom, a bromine atom, or a $CH_3COO-$ group, and a hydrophilic organic compound.

7 Claims, No Drawings

POLYMERIZATION INITIATOR COMPOSITION

BACKGROUND OF THE INVENTION

1. Field of the Invention

This invention relates to the mixture of an azobisamidine salt with a hydrophilic organic compound to be used as the polymerization initiator for solution polymerization or emulsion polymerization and a polymerization initiator composition formed of the mixture.

2. Description of the Related Art

Azobisamidine salts are finding utility as polymerization initiators for solution polymerization, emulsion polymerization, and photopolymerization of various acrylic monomers. Since the conventionally produced azobisamidine salts are in the form of a fine powder, the dust of this powder which arises during the manufacture of azobisamidine salt or during the use of the salt as a polymerization initiator is liable to drift in the ambient air, land on the exposed skin of a worker, and induce an eruption of the skin.

To preclude such disadvantages dependent on the morphology of fine powder as described above, granules of an azobisamidine salt and a method for the production thereof have been proposed (U.S. Pat. No. 4,916,216).

Since the method for the production of the pellets mentioned above uses water as a binder, however, it is at a disadvantage in requiring a high drying temperature and a long drying time. Further, the granules obtained by this method are deficient not only in stability but also in mechanical strength. They have a problem that the fine powder which occurs when the granules are fractured is drifted as dust.

This invention, therefore, has for an object thereof the provision of a novel mixture of an azobisamidine salt with a hydrophilic organic compound.

Another object of this invention is to provide a mixture of an azobisamidine salt with a hydrophilic organic compound which sparingly incurs the phenomenon of drift of dust and a polymerization initiator formed of the mixture.

SUMMARY OF THE INVENTION

The objects mentioned above are accomplished by the following items (i)–(vii).

(i) A polymerization initiator composition, comprising an azobisamidine salt represented by the general formula (1)

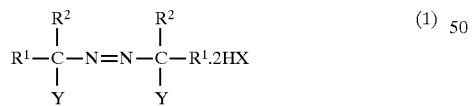

wherein $R^1$ and $R^2$ independently represent an alkyl group or a cycloalkyl group, providing that $R^1$ and $R^2$ may together form an aliphatic ring, and Y represents $-C(=NR^3)-NH-R^4$ or a guanyl group represented by the formula (2)

wherein $R^3$ and $R^4$ independently represent a hydrogen atom, an alkyl group, a substituted alkyl group, a cycloalkyl group, an allyl group, a phenyl group, or a substituted phenyl group, $R^5$ represents a lower alkylene group optionally containing a substituent group, and $R^6$ represents a hydrogen atom or a hydroxyalkyl group, and X represents a chlorine atom, a bromine atom, or a $CH_3COO-$ group, and a hydrophilic organic compound.

(ii) A composition according to Item (i) above, wherein the hydrophilic organic compound mentioned above is at least one member selected from the group consisting of polyhydric alcohols of 2 to 6 carbon atoms, polymers thereof, ethers and esters thereof, and monohydric alcohols of 3 to 6 carbon atoms.

(iii) A composition according to Item (i) above, wherein the hydrophilic organic compound mentioned above is one member selected from the group consisting of ethylene glycol, polyethylene glycol, propylene glycol, polypropylene glycol, trimethylene glycol, butanediol, pentanediol, isoprene glycol, methyl pentanediol, hexanediols, hexanetriols, trimethylolpropane, diethylene glycol, triethylene glycol, dipropylene glycol, ethylene glycol monoethers, ethylene glycol diethers, diethylene glycol monoethers, diethylene glycol acetate, triethylene glycol monoether, triethylene glycol diethers, polyethylene glycol monoethers, polyethylene glycol diethers, propylene glycol monoethers, propylene glycol diethers, dipropylene glycol monoethers, dipropylene glycol diethers, tripropylene glycol monoethers, tripropylene glycol diethers, poly(oxyethylene-oxypropylene) derivatives, polyethylene glycol monoethyl acetates, diethylene glycol monoether acetates, ethylene glycol monoacetate, propylene glycol monoacetate, ethylene glycol diacetate, lactic esters, pentaerythritol, hexylene glycol, 3-methyl-1,5-pentanediol, 3-methyl-3-methoxy-1-butanol, 3-methyl-3-methoxybutyl acetate, 3-methoxy-1-butanol, 3-methoxybutyl acetate, polyvinyl pyrrolidone, glycerol, diglycerol, polyglycerol, glyceryl acetate, propanols, butanols, pentanols, and hexanols. ( iv) A composition according to Item (i) above, wherein the content of the hydrophilic organic compound is in the range of 0.5 to 50% by weight, based on the amount of the azobisamidine salt.

(v) A composition according to Item (i) above, wherein the content of the hydrophilic organic compound is in the range of 1 to 30% by weight, based on the amount of the azobisamidine salt.

(vi) A composition according to Item (iv) above, wherein the hydrophilic organic compound mentioned above is at least one member selected from the group consisting of ethylene glycol, polyethylene glycol #300 (average molecular weight 300), polyethylene glycol #400 (average molecular weight 400), propylene glycol, 1,4-butane diol, isoprene glycol, diethylene glycol, ethylene glycol monobutyl ether, hexylene glycol, glycerol, and isobutanol.

(vii) A composition according to Item (i) above, wherein the azobisamidine salt mentioned above is 2,2'-azobis(2-amidinopropane) dihydrochloride.

The present invention, by mixing an azobisamidine salt, a substance useful as a water-soluble polymerization initiator, with a hydrophilic organic compound, can provide a mixture of the azobisamidine salt with the hydrophilic organic compound which sparingly incurs the phenomenon of drift of dust and a water-soluble polymerization initiator formed of the mixture.

DESCRIPTION OF THE PREFERRED EMBODIMENT

The azobisamidine salt according to this invention is a compound represented by the general formula (1)

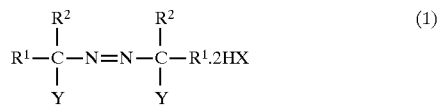

$$R^1-\underset{\underset{Y}{|}}{\overset{\overset{R^2}{|}}{C}}-N=N-\underset{\underset{Y}{|}}{\overset{\overset{R^2}{|}}{C}}-R^1.2HX \quad (1)$$

In this formula, $R^1$ and $R^2$ independently represent an alkyl group (having 1–10, preferably 1–4, carbon atoms) or a cycloalkyl group (having 3–7, preferably 3–6, carbon atoms), providing that $R^1$ and $R^2$ may together form an aliphatic ring, and Y represents —C(=NR$^3$)—NH—R$^4$ or a guanyl group represented by the formula (2)

$$\underset{-C-NR^6}{\overset{N-R^5}{\|}} \quad (2)$$

wherein $R^3$ and $R^4$ independently represent a hydrogen atom, an alkyl group (having 1–10, preferably 1–4, carbon atoms, a substituted alkyl group (having 1–6, preferably 1–3 carbon atoms), a cycloalkyl group (having 3–8, preferably 3–6 carbon atoms), an allyl group, a phenyl group, or a substituted phenyl group, preferably a hydrogen atom or an alkyl group, $R^5$ represents a lower alkylene group (having 2–5, preferably 2–3 carbon atoms) optionally containing a substituent group, and $R^6$ represents a hydrogen atom or a hydroxyalkyl group (having 1–7, preferably 1–3 carbon atoms)), and X represents a chlorine atom, a bromine atom, or a CH$_3$COO— group].

When $R^1$ and $R^2$ in the general formula (1) mentioned above each represent an alkyl group, the concrete examples of the alkyl group include methyl group, ethyl group, propyl group, isopropyl group, butyl group, isobutyl group, sec-butyl group, tert-butyl group, pentyl groups, hexyl groups, octyl groups, nonyl groups, and decyl groups (invariably in both linear and branched forms). When they each represent a cycloalkyl group, the concrete examples of the cycloalkyl group include cyclopropyl group, cyclohexyl group, cycloheptyl group, and cyclooctyl group. $R^1$ and $R^2$ may be mutually joined to form an aliphatic ring represented by the formula (3)

$$-\underset{\underset{Y}{|}}{\overset{\overset{R^1}{|}}{C}}-R^2 \quad (3)$$

As typical examples of the aliphatic ring, cyclohexane, cycloheptane, and cyclooctane may be cited.

As typical examples of the substituents, $R^3$ and $R^4$, in Y as the guanyl group of the general formula (1), hydrogen atom, methyl group, ethyl group, propyl group, isopropyl group, butyl group, isobutyl group, sec-butyl group, tert-butyl group, pentyl groups, hexyl groups, octyl groups, nonyl groups, and decyl groups (invariably in both linear and branched forms), substituted alkyl groups such as hydroxyethyl group, hydroxypropyl group, hydroxybutyl group, chloromethyl group, bromomethyl group, chloroethyl group, bromoethyl group, chloropropyl group, bromopropyl group, chlorobutyl group, bromobutyl group, benzyl group, and phenetyl group, cycloalkyl groups such as cyclopropyl group, cyclohexyl group, cycloheptyl group, and cyclooctyl group, and phenyl groups such as allyl group, phenyl group, tolyl group, ethylphenyl group, methoxyphenyl group, ethoxyphenyl group, hydroxyphenyl group, nitrophenyl group, aminophenyl group, acetylphenyl group, and acetylaminophenyl group may be cited.

As typical examples of the substituent $R^5$, such lower alkylene groups as ethylene group and trimethylene group and such lower alkylene groups having some of the hydrogen atoms thereof substituted by such lower alkyl groups as methyl group, ethyl group, propyl group, and butyl group andbyhydroxyl group may be cited. As concrete examples of the substituent $R^6$, hydrogen atom and such hydroxyalkyl groups as hydroxymethyl group, hydroxyethyl group, and hydroxypropyl group may be cited.

The hydrophilic organic compound to be used in this invention must be soluble in both a water-soluble organic solvent and water. It is also required to avoid being easily vaporized while being handled. The water-soluble organic compound of this description is preferred to be at least one member selected from the group consisting of polyhydric alcohols of 2 to 6 carbon atoms, polymers thereof, ethers and esters thereof, and monohydric alcohols of 3 to 6 carbon atoms. As typical examples of the hydrophilic organic compound, ethylene glycol, polyethylene glycol, propylene glycol, polypropylene glycol, propanediols (1,2-propanediol and 1,3-propanediol), butanediols (1,2-butanediol, 1,3-butanediol, 1,4-butanediol, and 2,3-butanediol), pentanediols (1,2-pentanediol, 1,3-pentanediol, 1,4-pentanediol, 1,5-pentanediol, 2,3-pentanediol, and 2,4-pentanediol), isoprene glycol, methyl pentanediol, hexanediols (1,2-hexanediol, 1,3-hexanediol, 1,4-hexanediol, 1,5-hexanediol, 1,6-hexanediol, and 2,5-hexanediol), hexanetriols (1,2,3-hexane triol and 1,2,6-hexane triol), trimethylol propane, diethylene glycol, triethylene glycol, dipropylene glycol, ethylene glycol monoethers (monomethyl ether, monoethyl ether, monopropyl ether, monoisopropyl ether, monobutyl ether, monoamyl ether, monoisoamyl ether, monohexyl ether, and monophenyl ether), ethylene glycol diethers (dimethyl ether, diethyl ether, dipropyl ether, diisopropyl ether, dibutyl ether, diisoamyl ether, and dihexyl ether), diethylene glycol monoethers (monomethyl ether, monoethyl ether, monopropyl ether, monoisopropyl ether, monobutyl ether, monoamyl ether, monoisoamyl ether, monohexyl ether, and monophenyl ether), diethylene glycol diethers (dimethyl ether, diethyl ether, dipropyl ether, diisopropyl ether, dibutyl ether, diisoamyl ether, dihexyl ether, and dibutyl methyl ether), diethylene glycol acetate, triethylene glycol monoethers (monomethyl ether, monoethyl ether, monopropyl ether, monoisopropyl ether, monobutyl ether, monoamyl ether, monoisoamyl ether, monohexyl ether, and monophenyl ether), triethylene glycol diethers (dimethyl ether, diethyl ether, dipropyl ether, diisopropyl ether, dibutyl ether, diisoamyl ether, and dihexyl ether), polyethylene glycol monoethers (monomethyl ether, monoethyl ether, monopropyl ether, monoisopropyl ether, monobutyl ether, monoamyl ether, monoisoamyl ether, monohexyl ether, and monophenyl ether), polyethylene glycol diethers (dimethyl ether, diethyl ether, dipropyl ether, diisopropyl ether, dibutyl ether, diisoamyl ether, and dihexyl ether), propylene glycol monoethers (monomethyl ether, monoethyl ether, monopropyl ether, monoisopropyl ether, monobutyl ether, monoamyl ether, monoisoamyl ether, monohexyl ether, and monophenyl ether), propylene glycol diethers (dimethyl ether, diethyl ether, dipropyl ether, diisopropyl ether, dibutyl ether, diisoamyl ether, and dihexyl ether), dipropylene glycol monoethers (monomethyl ether, monoethyl ether, monopropyl ether, monoisopropyl ether, monobutyl ether, monoamyl ether, monoisoamyl ether, monohexyl ether, and monophenyl ether), dipropylene glycol diethers (dimethyl ether, diethyl ether, dipropyl ether, diisopropyl ether, dibutyl ether, diisoamyl ether, and dihexyl ether), tripropylene glycol monoethers (monomethyl ether, monoethyl ether, monopropyl ether, monoisopropyl ether, monobutyl ether, monoamyl ether, monoisoamyl ether, monohexyl ether, and monophenyl ether, tripropylene glycol diethers (dimethylether, diethylether, dipropyl ether, diisopropyl ether, dibutyl ether, diisoamyl ether, and dihexyl ether), poly(oxyethylene-oxypropylene) derivatives (polyoxy-ethylene-polyoxypropylene block polymer and polyoxyethylene-polyoxypropylene alkyl ether), polyethylene glycol monoether acetates (monomethyl ether acetate, monoethyl ether acetate, monopropyl ether acetate, monobutyl ether acetate, monoamyl ether acetate, and monohexyl ether acetate), diethylene glycol monoether acetates (monomethyl ether acetate, monoethyl ether acetate, monopropyl ether acetate, monobutyl ether acetate, monoamyl ether acetate, and monohexyl ether acetate), ethylene glycol monoacetate, propylene glycol monoacetate, ethylene glycol diacetate, lactic esters (methyl ester, ethyl ester, and butyl ester), pentaerythritol, hexylene glycol, 3-methyl-1,5-pentanediol, 3-methyl-3-methoxy-l-butanol, 3-methyl-3-methoxy butyl acetate, 3-methoxy-1-butanol, 3-methoxy butyl acetate, polyvinyl pyrrolidone, glycerol, diglycerol, polyglycerol, glyceryl acetates (glyceryl monoacetate, glyceryl diacetate, and glyceryl triacetate), propanols (n-propanol and isopropanol), butanols (n-butanol, isobutanol, secondary butanol, and tertiary butanol), pentanols (1-pentanol, 2-pentanol, 3-pentanol, 3-methyl-1-butanol, and 1-ethyl-propanol), and hexanols (1-hexanol, 2-hexanol, 3-hexanol, 4-methyl-2-pentanol, and 2-ethyl butanol) may be cited. These hydrophilic organiccompounds maybe used either singly or in the form of a mixture of two or more members. Among other hydrophilic organic compounds cited above, at least one member selected from the group consisting of polyhydric alcohols of 2 to 6 carbon atoms, polymers thereof, and ethers and esters thereof, and monohydric alcohols of 3 and 4 carbon atoms is preferably used. As typical examples of the preferred hydrophilic organic compound, ethylene glycol, polyethylene glycol #300 (average molecular weight 300), polyethylene glycol #400 (average molecular weight 400), propylene glycol, 1,4-butanediol, isoprene glycol, diethylene glycol, ethylene glycol monobutyl ether, hexylene glycol, glycerol, and isobutanol may be cited. These preferred hydrophilic organic compounds may be used either singly or in the form of a mixture of two or more members.

The amount of the hydrophilic organic compound to be used is in the range of 0.5–50% by weight, preferably 1–30% by weight, and more preferably 2–15% by weight, based on the amount of the azobisamidine salt (on dry basis). If this amount is less than 0.5% by weight, the fine powder of the azobisamidine salt will not be fully satisfactorily aggregated and will tend to give rise to dust. If the amount exceeds 50% by weight, the amount of the hydrophilic organic compound as impurity will be unduly large.

The production of the mixture of the azobisamidine salt with the water-soluble organic compound according to this invention is accomplished by incorporating the hydrophilic organic compound or a solution thereof in a water-soluble organic solvent by spraying or some other proper method into the azobisamidine salt still in a wet state during the manufacture of the azobisamidine salt and thereafter drying the produced wet blend by an ordinary method. The hydrophilic organic compound, when necessary, may be directly mixed with the azobisamidine salt in a dry state by means of a mixer.

EXAMPLE 1

In an eggplant-shaped flask having an inner volume of 500 ml, 115.0 g of 2,2'-azobis(2-amidinopropane) dihydrochloride containing 15% of methanol was placed and a solution of 3.0 g of polyethylene glycol #400 (average molecular weight 400) in 3.0 g of methanol was added thereto by means of a syringe and they were mixed. The resultant mixture was dried in a rotary evaporator under a reduced pressure of 30 Torrs at 35° C. for 2 hours. The produced 2,2 -azobis (2-amidinopropane) dihydrochloride had an assay of 97.0%. Even after 12 months' standing at normal room temperature, it showed absolutely no discernible change due to aging.

The sample, 30.00 g, of this salt was subjected to the following dusting test.

In a beaker (made of glass and measuring 6.5 cm in diameter and 9 cm in height) provided with a stirring device obtained by attaching crescent Teflon (tetrafluoroethylene resin) vanes (each measuring 6 cm in length, 2 cm in height, and 3 mm in thickness) to a glass rod, 8 mm in diameter, the sample was stirred at a rate of 500 rpm for 30 minutes. The sample emitted no dust during the stirring and showed no weight loss at the end of the stirring.

EXAMPLE 2

In an eggplant-shaped flask having an inner volume of 500 ml, 115.0 g of 2,2'-azobis(2-amidinopropane) dihydrochloride containing 15% of methanol was placed and a solution of 10.0 g of polyethylene glycol #400 (average molecular weight 400) in 10.0 g of methanol was added thereto by means of a syringe and they were mixed. The resultant mixture was dried in a rotary evaporator under a reduced pressure of 30 Torrs at 35° C. for 2 hours. The produced 2,2'-azobis (2-amidinopropane) dihydrochloride had an assay of 90.0%. Even after 12 months' standing at normal room temperature, it showed absolutely no discernible change due to aging. When it was subjected to the dusting test by faithfully following the procedure of Example 1, it emitted no dust during the stirring and showed no weight loss at the end of the stirring.

EXAMPLE 3

When 2,2'-azobis(2-amidinopropane) dihydrochloride was obtained by faithfully following the procedure of Example 2 while using 10.0 g of propylene glycol in the place of the polyethylene glycol #400 (average molecular weight of 400), the results were the same as those of Example 2.

EXAMPLE 4

When 2,2'-azobis(2-amidinopropane) dihydrochloride was obtained by faithfully following the procedure of Example 2 while using 10.0 g of ethylene glycol in the place of the polyethylene glycol #400 (average molecular weight of 400), the results were the same as those of Example 2.

EXAMPLE 5

When 2,2'-azobis(2-amidinopropane) dihydrochloride was obtained by faithfully following the procedure of Example 2 while using 10.0 g of 1,4-butane diol in the place of the polyethylene glycol #400 (average molecular weight of 400), the results were the same as those of Example 2.

EXAMPLE 6

When 2,2'-azobis(2-amidinopropane) dihydrochloride was obtained by faithfully following the procedure of Example 2 while using 10.0 g of isoprene glycol in the place of the polyethylene glycol #400 (average molecular weight of 400), the results were the same as those of Example 2.

EXAMPLE 7

When 2,2'-azobis(2-amidinopropane) dihydrochloride was obtained by faithfully following the procedure of Example 2 while using 10.0 g of diethylene glycol in the place of the polyethylene glycol #400 (average molecular weight of 400), the results were the same as those of Example 2.

EXAMPLE 8

When 2,2'-azobis(2-amidinopropane) dihydrochloride was obtained by faithfully following the procedure of Example 2 while using 10.0 g of ethylene glycol monobutyl ether in the place of the polyethylene glycol #400 (average molecular weight of 400), the results were the same as those of Example 2.

EXAMPLE 9

When 2,2'-azobis(2-amidinopropane) dihydrochloride was obtained by faithfully following the procedure of Example 2 while using 10.0 g of hexylene glycol in the place of the polyethylene glycol #400 (average molecular weight of 400), the results were the same as those of Example 2.

EXAMPLE 10

When 2,2'-azobis (2-amidinopropane) dihydrochloride was obtained by faithfully following the procedure of Example 2 while using 10.0 g of glycerol in the place of the polyethylene glycol #400 (average molecular weight of 400), the results were the same as those of Example 2.

EXAMPLE 11

In a stainless steel super mixer, 100 liters in inner volume, (produced by Kawata K.K.), 20 kg of 2,2'-azobis(2-amidinopropane) dihydrochloride in a dry powdery state was placed and stirred and a solution of 2.2 kg of polyethylene glycol #400 (average molecular weight 400) in 2.2 kg of methanol was added thereto and they were further stirred and mixed at 300 rpm for 30 minutes. By performing this procedure up to 30 repetitions to treat a total of 600 kg of 2,2'-azobis(2-amidino-propane) dihydrochloride in a dry powdery state. The treated salt was placed in a glass-lined conical drier, 5 m$^3$ in inner volume, and dried therein under a reduced pressure of 24 Torrs for 20 hours, with the jacket temperature controlled in the range of 30°–40° C. Consequently, 664.7 kg of a mixture of 2,2 '-azobis (2 -amidinopropane) dihydrochloride with polyethylene glycol #400 having an assay of 89.6%. Even after 12 months' standing at normal room temperature, the sample showed no discernible change due to aging. When the sample was subjected to the dusting test by faithfully following the procedure of Example 1, it emitted no dust during the stirring and showed no weight loss at the end of the stirring.

Control 1

When a powdery dry product of 2,2'-azobis(2-amidinopropane) dihydrochloride was subjected to the dusting test by faithfully following the procedure of Example 1, it emitted dust during the stirring and showed a weight loss of 4.4% by weight at the end of the stirring.

Control 2

When granules of 2,2'-azobis(2-amidinopropane) dihydrochloride using water as a binder were subjected to the dusting test at a stirring rate of 400 rpm by following the procedure of Example 1, they emitted dust during the stirring and showed a weight loss of 1.4% by weight at the end of the stirring.

What is claimed is:

1. A polymerization initiator composition, comprising an azobisamidine salt represented by the general formula (1)

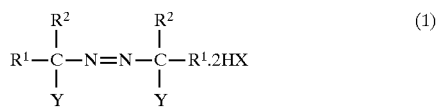

wherein $R^1$ and $R^2$ independently represent an alkyl group or a cycloalkyl group, or $R^1$ and $R^2$ may together form an aliphatic ring, and Y represents —C(=NR$^3$)—NH—R$^4$ or a guanyl group represented by the formula (2)

wherein $R^3$ and $R^4$ independently represent a hydrogen atom, an alkyl group, a substituted alkyl group, a cycloalkyl group, an allyl group, a phenyl group, or a substituted phenyl group, $R^5$ represents a lower alkylene group optionally containing a substituent group, and $R^6$ represents a hydrogen atom or a hydroxyalkyl group, and X represents a chlorine atom, a bromine atom, or a CH$_3$COO— group, and a hydrophilic organic compound.

2. A composition according to claim 1, wherein said hydrophilic organic compound is at least one member selected from the group consisting of polyhydric alcohols of 2 to 6 carbon atoms, polymers thereof, ethers and esters thereof, and monohydric alcohols of 3 to 6 carbon atoms.

3. A composition according to claim 1, wherein said hydrophilic organic compound is one member selected from the group consisting of ethylene glycol, polyethylene glycol, propylene glycol, polypropylene glycol, trimethylene glycol, butanediol, pentanediol, isoprene glycol, methyl pentanediol, hexanediol, hexanetriols, trimethylol propane, diethylene glycol, triethylene glycol, dipropylene glycol, ethylene glycol monoethers, ethylene glycol diethers, diethylene glycol monoethers, diethylene glycol acetate, triethylene glycol monoether, triethylene glycol diethers, polyethylene glycol monoethers, polyethylene glycol diethers, propylene glycol monoethers, propylene glycol diethers, dipropylene glycol monoethers, dipropylene glycol diethers, tripropylene glycol monoethers, tripropylene glycol diethers, poly(oxyethylene-oxypropylene) derivatives, polyethylene glycol monoethyl acetates, diethylene glycol monoether acetates, ethylene glycol monoacetate, propylene glycol monoacetate, ethylene glycol diacetate, lactic esters, pentaerythritol, hexylene glycol, 3-methyl-1, 5-pentanediol, 3-methyl-3-methoxy-1-butanol, 3-methyl-3-methoxybutyl acetate, 3-methoxy-1-butanol, 3-methoxybutyl acetate, polyvinyl pyrrolidone, glycerol, diglycerol, polyglycerol, glyceryl acetate, propanols, butanols, pentanols, and hexanols.

4. A composition according to claim 1, wherein the content of said hydrophilic organic compound is in the range of 0.5 to 50% by weight, based on the amount of said azobisamidine salt.

5. A composition according to claim 1, wherein the content of said hydrophilic organic compound is in the range of 1 to 30% by weight, based on the amount of said azobisamidine salt.

6. A composition according to claim 4, wherein said hydrophilic organic compound is at least one member selected from the group consisting of ethylene glycol, polyethylene glycol #300 (average molecular weight 300), polyethylene glycol #400 (average molecular weight 400), propylene glycol, 1,4-butane diol, isoprene glycol, diethylene glycol, ethylene glycol monobutyl ether, hexylene glycol, glycerol, and isobutanol.

7. A composition according to claim 1, wherein said azobisamidine salt is 2,2'-azobis(2-amidinopropane) dihydrochloride.

* * * * *